US005344265A

United States Patent [19]

Ullman et al.

[11] Patent Number: 5,344,265

[45] Date of Patent: Sep. 6, 1994

[54] SECUREMENT SYSTEM FOR A ROLLABLE MOBILITY AID

[75] Inventors: David G. Ullman; Katharine M. Hunter-Zaworski; Joseph R. Zaworski; Derald E. Herling, all of Corvallis; Garrett E. Clark, Salem, all of Oreg.

[73] Assignee: State of Oregon, acting by and through the state Board of Higher Education on behalf of OSU, Eugene, Oreg.

[21] Appl. No.: 96,056

[22] Filed: Jul. 22, 1993

Related U.S. Application Data

[63] Continuation of Ser. No. 930,194, Aug. 11, 1992, abandoned.

[51] Int. Cl.[5] .................................................. B60P 7/00

[52] U.S. Cl. .................................................. 410/3

[58] Field of Search .................. 410/3, 4, 7; 296/35.1, 296/35.2, 35.3, 35.4, 36, 65.1; 188/32, 5; 248/503.1; 280/250.1, 304.1; 297/DIG. 4

[56] References Cited

U.S. PATENT DOCUMENTS

| | | | |
|---|---|---|---|
| 1,835,840 | 12/1931 | Barclay | 296/65.1 |
| 2,101,210 | 12/1937 | Barclay | 296/65.1 |
| 2,818,910 | 1/1958 | Hawkins | 297/45 |
| 4,019,752 | 4/1977 | Leon | 280/1 |
| 4,060,271 | 11/1977 | Williams | 188/4 R |
| 4,062,209 | 12/1977 | Downing et al. | 70/226 |
| 4,076,268 | 2/1978 | Hart | 296/35.1 |
| 4,093,303 | 6/1978 | Nelson | 410/4 |
| 4,103,934 | 8/1978 | Arnhold et al. | 410/7 |
| 4,265,478 | 5/1981 | Korsgaard | 296/65.1 |
| 4,325,576 | 4/1982 | Guthrie | 296/65.1 |
| 4,389,056 | 6/1983 | Tenniswood | 296/65.1 |
| 4,407,616 | 10/1983 | Hinze | 410/3 |
| 4,427,210 | 1/1984 | Wevers | 248/503.1 |
| 4,449,561 | 5/1984 | Head | 152/213 R |
| 4,455,046 | 6/1984 | Linderoth | 296/68.1 |
| 4,457,551 | 7/1984 | Anthony | 296/65.1 |
| 4,475,762 | 10/1984 | Delong et al. | 296/65.1 |
| 4,492,403 | 1/1985 | Blomgren et al. | 296/68.1 |
| 4,511,171 | 4/1985 | Petersen | 296/65.1 |
| 4,538,825 | 9/1985 | Delahoussaye et al. | 280/250.1 |

(List continued on next page.)

FOREIGN PATENT DOCUMENTS

| | | | |
|---|---|---|---|
| 3423646 | 1/1986 | Fed. Rep. of Germany | 410/4 |

OTHER PUBLICATIONS

Brochure–Tie Tech is Simply Safer.

Brochure No. 17859–Wheelchair & Occupant Belt/-Track System by Braun Corporation.

Brochure–by Creative Controls, Inc.

(List continued on next page.)

*Primary Examiner*—Mark T. Le

*Attorney, Agent, or Firm*—Kolisch Hartwell Dickinson McCormack & Heuser

[57] ABSTRACT

A securement system is provided for a rollable mobility aid with a frame and rollers, which aid is located adjacent surrounding structure such as the interior of a vehicle. The system includes protruding structure attached to such frame, with a substantially rigid, operative section that includes a broad engaging expanse. Also included is upright receiver (or capture) structure fixedly attached to such vehicle in a receiving position, and including a receiving section that is correspondingly broad with respect to the engaging expanse. The receiving section further includes a selectively actuable securement/release mechanism for securing the operative section to the vehicle. The protruding structure is shown as plural spaced members, with the receiver structure being constructed with receiving sections to receive each member. The receiver structure is shown as capable of selective rotation about its vertical axis and selective translation with respect to its receiving position. The system is also shown with indicator structure operatively connected to the securement/release mechanism and structured to provide an indication of whether a securement condition exists. Plural types of actuators for the securement/release mechanism are also provided.

27 Claims, 6 Drawing Sheets

U.S. PATENT DOCUMENTS

| | | | |
|---|---|---|---|
| 4,623,289 | 11/1986 | Apostolos | 410/7 |
| 4,688,843 | 8/1987 | Hall | 296/65.1 |
| 4,690,364 | 9/1987 | Constantin | 248/503.1 |
| 4,729,573 | 3/1988 | Davis | 280/304.1 |
| 4,730,964 | 3/1988 | Joyner | 410/23 |
| 4,754,946 | 7/1988 | Constantin | 248/503.1 |
| 4,913,265 | 4/1990 | Richards | 188/32 |
| 4,966,392 | 10/1990 | Featon et al. | 280/801 |
| 4,973,022 | 11/1990 | Mayland | 248/503.1 |
| 5,044,845 | 9/1991 | Baker | 410/3 |
| 5,122,024 | 6/1992 | Stokes | 410/3 |

OTHER PUBLICATIONS

Brochure No. 17790–Wheelchair & Occupant Belt/-Track System by Braun Corporation.

Brochure–Your road to Mobility by Braun Corporation.

Brochure–Paratransit Vans by Braun Corporation.

American Seating Wheelchair Restraint Seating Systems for Public Transportation Vehivles by Otaco Seating Co. Ltd.

Introduction to . . . Q'Straint "let safety tie you down. . . ".

Insert–Saf–T–Straint (Extra Security in a Wheelchair).

Brochure–Series E/A System Attachment Instructions.

Brochure–Econo–Ramp (Economical Wheelchair Accessibility).

Brochure–Collins Ambulance Corp. Paratransit Van.

Brochure–Collins Mobile–Tech Corporation–"Specifications W–85 Transit–Locks".

Brochure–Collins Mobile–Tech Corporation–"Semi–Automatic Wheelchair Lift Bid Specifications".

Brochure–Collins Mobile–Tech Corporation–"Tech II Gravity Down Wheelchair Lift Bid Specifications".

Brochure–Collins Mobile–Tech Corporation–'-'Automatic Wheelchair Lift Bid Specifications".

Services for Independent Living, Inc. Project Action, Final Report 1992 by Bauer and Reger.

Brochure–C. N. Unwin Limited regarding "The Future in total Wheelchair Restraint".

Installation Instructions for Model 9000 Bracket by E. Z. Lock of Baton Rouge, LA.

Brochure–Wheelchair Transporation Accessories by The Braun Corporation.

Insert–Flip Seat "Versatile Accessory Seating".

Insert–"Reliable Wheelchair Securement", by Collins Mobile–Tech Corporation.

Brochure–Collins Mobile–Tech Corp. dated Oct. 1990 describing accessories.

Installation Instructions re Everest–Jenning Power Wheelchair.

SECUREMENT SYSTEM FOR A ROLLABLE MOBILITY AID

This invention was made with government support under Agreement No. OR-11-0006 awarded by the U.S. Department of Transportation. The government has certain rights in the invention.

This is a continuation of application Ser. No. 07/930,194 filed Aug. 11, 1992, now abandoned.

BACKGROUND OF THE INVENTION

The present invention relates to securement systems for rollable mobility aids, and more particularly to such a system designed for securing a rollable mobility aid within a transit vehicle.

Various devices are known which allow physically disabled people to travel independently. Such devices, known generically as rollable mobility aids (or mobility aids), include wheelchairs, three-wheeled scooters, power bases, etc.

There are instances where an occupant of such a mobility aid must, for safety or other reasons, secure it to surrounding structure. Such an instance occurs when the occupant boards a transit vehicle such as a van, bus or train. Safety laws require that the transit vehicle be equipped with a device for securing the mobility aid within the vehicle.

The problem for designers of mobility aid securement systems is to design such securement devices with superior, fail-safe securement capability while at the same time being easy and quick to operate by both the mobility aid occupant and the bus driver. Several conventional systems have been proposed in the form of wheelchair restraint devices, but none have been completely satisfactory. For example, some conventional devices are strap/belt based which makes them difficult to use, as well as being time-consuming for bus drivers. Other proposals include mechanisms for clamping the wheels of a wheelchair in place but such mechanisms can damage the wheels and their corresponding rims if the bus swerves, is involved in an accident, or otherwise moves in such a way that causes the wheelchair to move with respect to the mechanism.

Still other conventional restraining devices include a post which extends downwardly from the wheelchair and is engaged by a vehicle-floor-mounted locking assembly such as is shown in U.S. Pat. Nos. 4,754,946 and 4,690,364, both to Constantin, and U.S. Pat. No. 4,973,022 to Mayland. Like the wheel clamp restraining devices, such floor-mounted restraining devices may be easily damaged in accident conditions because tilting of the wheelchair could cause the post to bend. Even worse, if the bus rides over a large bump, the wheelchair might be forced upward and become dislodged from the device. Such a result is obviously unacceptable.

Another conventional proposal is proposed in U.S. Pat. No. 4,265,478 to Korsgaard which discloses a thin latch plate mounted to tall, fixed, free-standing pillar stands that is latchable to a release bar mounted on a wheelchair. The restraining system in Korsgaard is unwieldy and its thin latch plate does not provide a latch mechanism that can withstand the rough treatment commonly encountered on transit vehicles. Such a latch mechanism will also be lacking in ability to resist tilting of the wheelchair.

It is a principal object of the present invention to provide a system which promotes securement of mobility aids to interior structure of transit vehicles, and which overcomes the drawbacks and limitations of prior art proposals. More specifically, the invention has as its objects the following:

(1) to provide such a system that achieves sustained securement in normal and accident conditions on the transit vehicle, and ensures that the mobility aid can be released from securement under all conditions;

(2) to provide such a system that is both easy to use by mobility aid occupants and transit vehicle operators having little skill, and requires a minimum of training;

(3) to provide such a system that promotes fast and easy securement even when mobility aid occupants approach it from various angles and positions;

(4) to provide such a system that is usable by occupants with limited use of their arms and hands;

(5) to provide such a system that is capable of absorbing shock from the transit vehicle and substantially lessening transfer of such shock to the mobility aid;

(6) to provide such a system that indicates when a securement condition exists, both locally to the aid occupant, and remotely to the transit driver;

(7) to develop a system with a release mechanism which can be actuated either locally by the occupant, or remotely by the driver;

(8) to develop an attachment concept that is usable with all commonly used mobility aids;

(9) to provide a mobility aid attachment system which can be retrofitted to existing transit vehicles and to existing mobility aids; and

(10) the provision of a securement system structure which can be locked in position while the vehicle is in motion.

SUMMARY OF THE INVENTION

The present invention achieves the above objects by providing a securement system for a rollable mobility aid with a frame and rollers, which aid is located adjacent surrounding structure such as the interior of a transit vehicle. The system includes protruding structure attached to and extending outwardly from such frame, and including a substantially rigid, operative section with a broad engaging expanse. Also included is upright receiver structure fixedly attached to such transit vehicle in a receiving position, and including a receiving section that is correspondingly broad with respect to the engaging expanse. The receiving section further includes a selectively actuable securement-/release mechanism for securing the operative section when there is engagement between the engaging expanse and the receiving section, with such engagement promoting securement of the aid relative to the transit vehicle.

In one embodiment of the present invention, the protruding structure may be formed as plural spaced members, with the receiver structure being constructed with receiving sections to receive each member. The system may also be constructed with the receiver structure built to be selectively rotated about its vertical axis and to be selectively translated with respect to its receiving position, thus to allow for desired adjustment of the receiver structure to accommodate receipt of the protruding structure by the securement/release mechanism at various positions and angles depending upon the direction from which such aid is rolled toward the system.

Additionally, the system may be provided with indicator structure operatively connected to the securement/release mechanism and structured to provide an indication, both locally and remote, of whether a securement condition exists. Also, the system may include plural types of actuators for the securement/release mechanism, with one type being a preferred actuator and another type being a default actuator for use if the preferred type malfunctions, thus ensuring that the aid occupant may be released from the system.

These and additional objects and advantages of the present invention will be more readily understood after a consideration of the drawings and the detailed description of the preferred embodiment.

DETAILED DESCRIPTION OF THE PREFERRED EMBODIMENT

Figure 1:
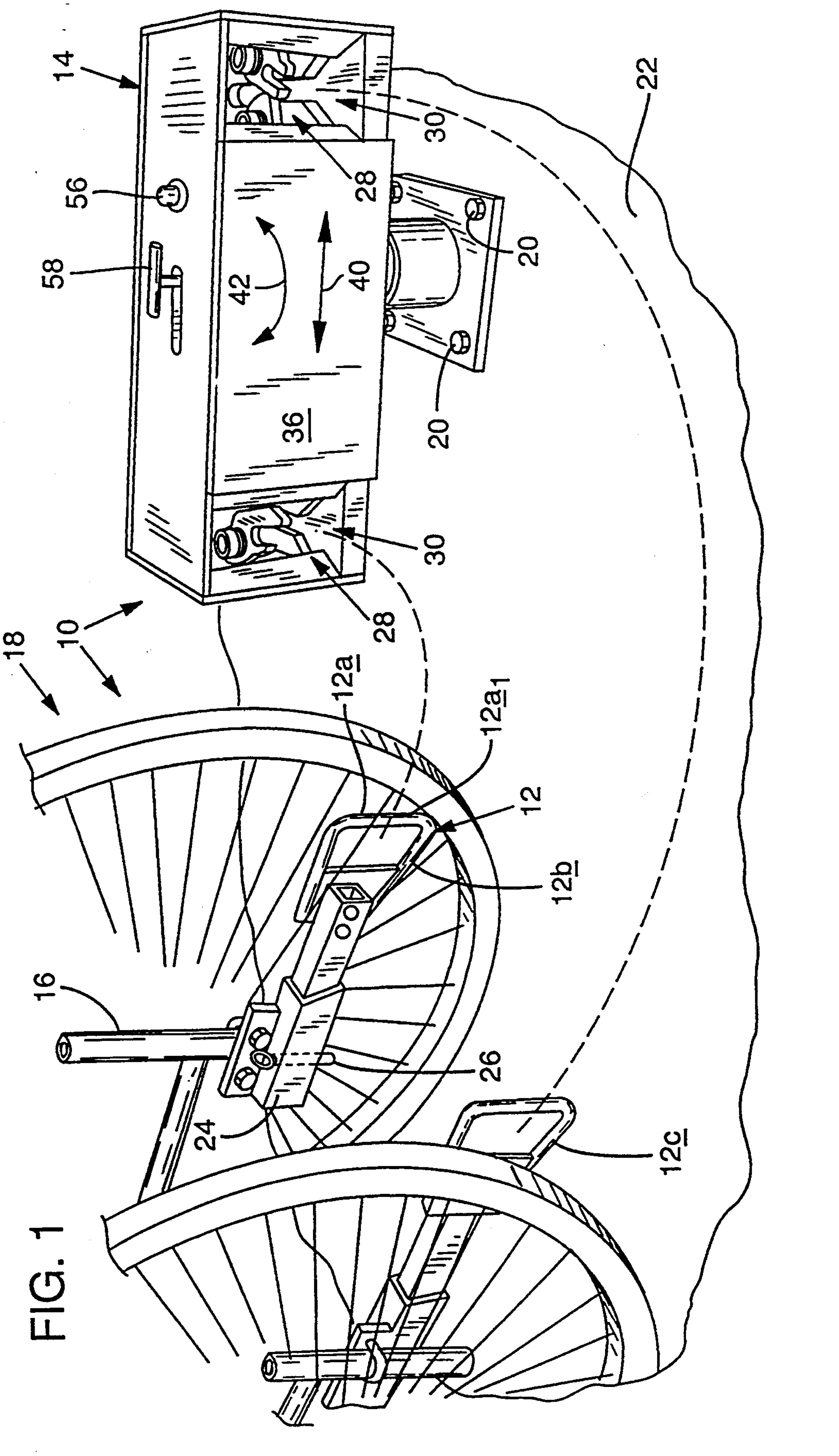
FIG. 1 is a perspective view of the preferred embodiment of the present invention with protruding structure extending from the back of a wheelchair and upright receiver structure fixedly attached to the floor of a bus.

Turning to the drawings, FIG. 1 shows the preferred embodiment of the present invention generally at 10, which includes protruding structure 12 and upright receiver (or capture) structure 14. Protruding structure 12 is attached to and extending outwardly from the back of frame 16 of wheelchair 18, although it is again to be understood that the invention can also be used with scooters, power bases and the like. Receiver structure 14 is fixedly attached via bolts 20 to the floor 22 of a bus or other transit vehicle such as a van, train, airplane, etc. The specific location on the bus of receiver structure 14 is optional, but when installed on a bus the inventors presently propose placing it to the rear side of the usual foldable bench seats near the front of the bus, i.e., where most conventional mobility aid securement devices are located.

Still referring to FIG. 1, it should be clear that protruding structure 12 includes a substantially rigid, operative section **12*a* with a broad engaging expanse 12*a*₁. Protruding structure 12 is also preferably provided with an upright section which section in FIG. 1 corresponds to broad engaging expanse 12*a*₁. The reasons for providing such upright section will be described. The protruding structure is also often removably attached to frame 16 as by slidably fitting into sleeve 24 and being held in the sleeve by pin 26**, particularly when mounted to a wheelchair. On the other hand, the protruding structure is not normally mounted removably when used with scooters or power bases.

Still referring to FIG. 1, receiver structure 14 is shown in a receiving position, and includes a receiving section 28 that is correspondingly broad with respect to engaging expanse **12*a*₁. The receiving section also includes a selectively actuable securement/release mechanism 30 (FIG. 2), the details of which will soon be described. Preferably receiver structure 14** is generally the same dimension as the usual bus heater system, so it protrudes no more than that from the side of the bus.

As shown in FIG. 1, it should also be understood that protruding structure 12 is preferably built as plural (most preferably dual) spaced members **12*b,c*, and receiver structure 14** is constructed with receiving sections to receive each member. The reason for such laterally spaced members is to inhibit tilting and rotation of the mobility aid.

Figure 2:
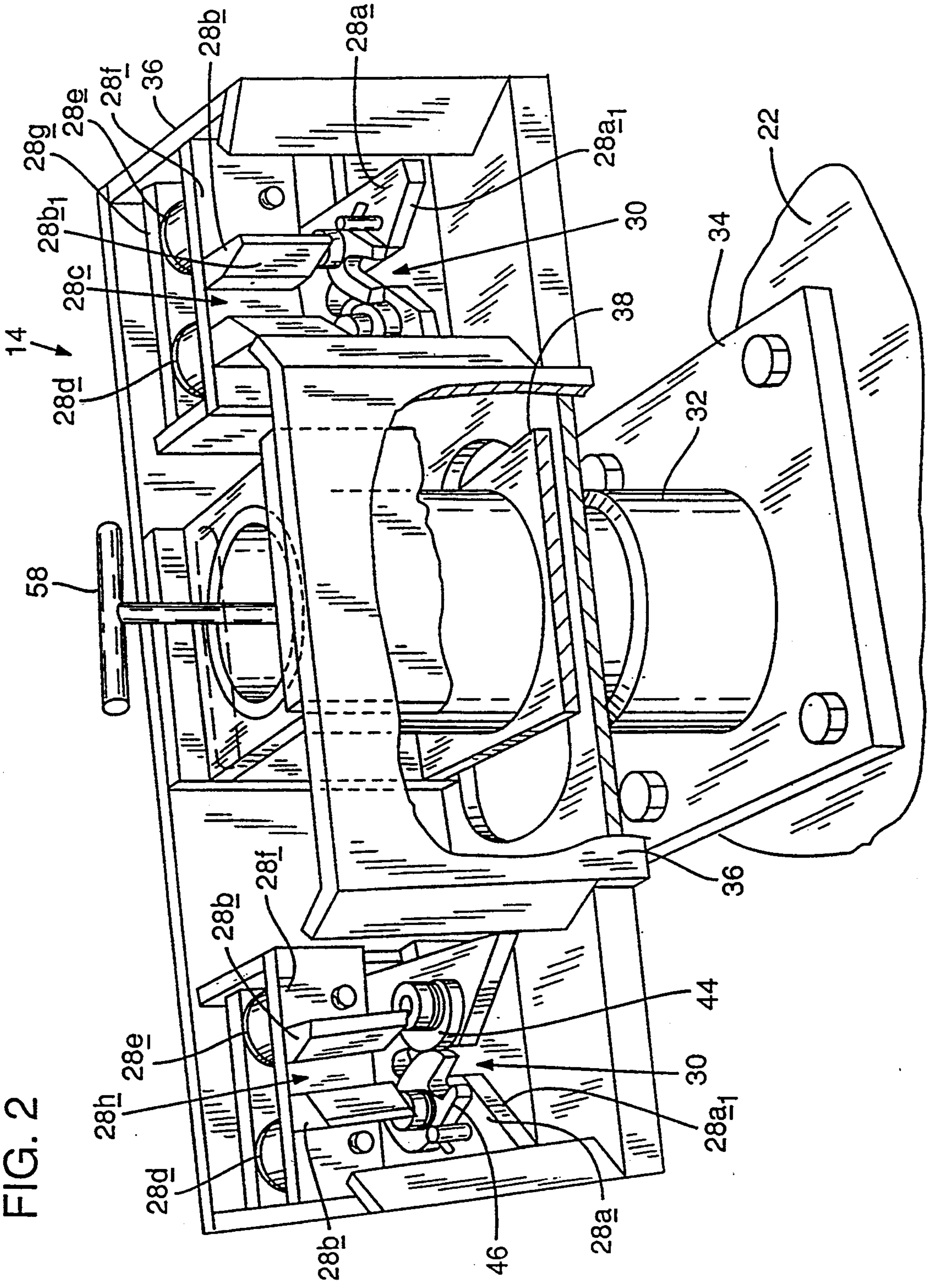
FIG. 2 is an isometric view of the receiver (or capture) structure with portions broken away to show detail.
Figure 3:
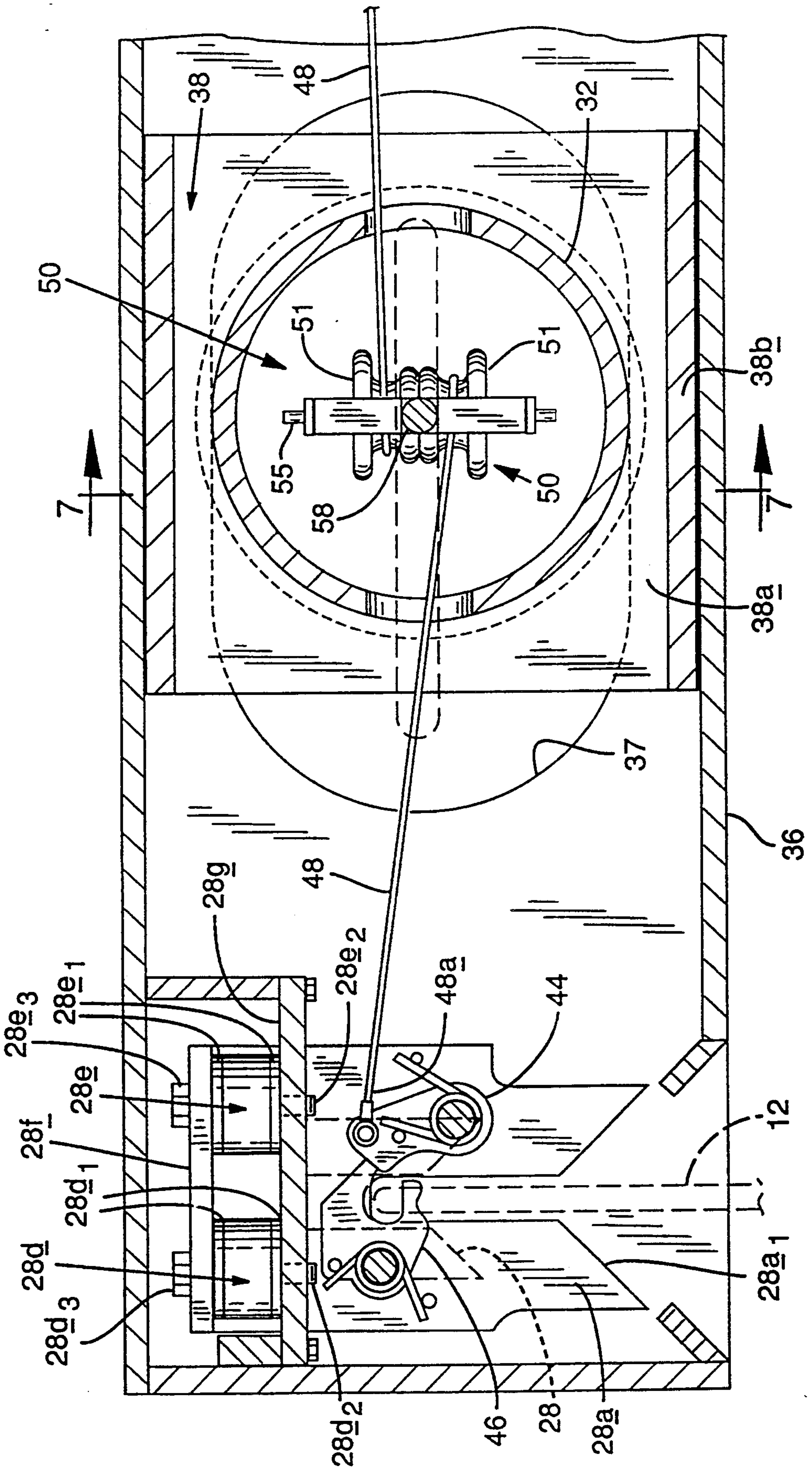
FIG. 3 is a fragmentary top plan view of FIG. 2 on an enlarged scale with certain portions broken away to show detail.

Referring to FIGS. 1–3, it should be understood that receiver structure 14 is constructed to be selectively translated (slided) or rotated with respect to its receiving position to a distance of about plus or minus one inch and plus or minus about ten degrees, respectively. Referring to FIG. 2, the receiving structure includes cylinder 32 extending upwardly from and fixed to plate 34. Rectangular housing 36 is mounted on cylinder 32 in a raised position via a support bracket 38. Bracket section **38*a* is rotatably attached to the top of cylinder 32, and bracket section 38*b* is translationally or slidably attached to rectangular housing 36. An oblong hole 37 of suitable dimension is formed in the bottom of housing 36 to allow it to move translationally with respect to bracket 38 as shown by arrow 40 in FIG. 1. The resulting rotatable and translatable attachment of housing 36 to cylinder 32 facilitates movement as shown by arrows 40 and 42 in FIG. 1**. It may be desirable in certain applications to include an interlock, which prevents either rotation or translation or both, while the vehicle is moving. For simplification, that mechanism has not been depicted, but might be in the form of a solenoid actuated key or similar structure, which would lock the housing or otherwise limit or prevent translation and rotation.

Figure 4:
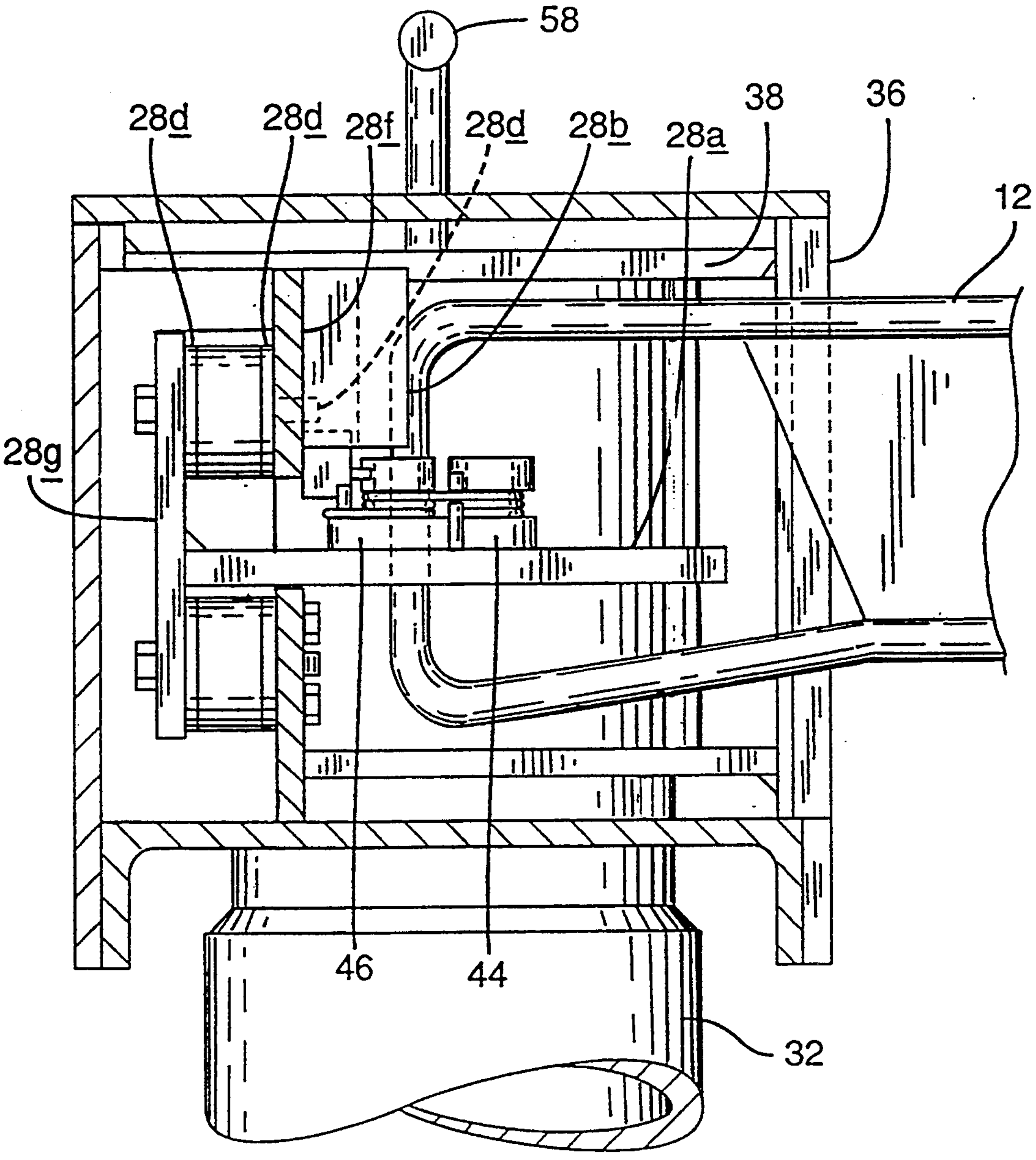
FIG. 4 is a side elevation sectional view.

Referring to FIGS. 2–4, receiving section 28 will be described in further detail to make clear its broad expanse. The receiving section includes plate **28*a* and opposing bars 28*b* which together provide a suitably broad expanse to correspond with that of protruding structure 12 to promote improved securement. The broad shape of both receiving section 28 and protruding structure 12 accommodates a wide tolerance for misalignments on entry. The angled surfaces 28*a*₁ and 28*b*₁ promote receipt of the protruding structure even when the first contact between the members is not exactly in the central space 28*c*. The same is true on the opposite side of receiver structure 14**.

Still referring to FIGS. 2–4, receiving section 28 includes shock absorber structure **28*d,e* which is attached to securement/release mechanism 30 as best shown in FIG. 4. Referring to FIG. 3, shock absorber structure 28*d,e* is formed from flexible, resilient cylinders each having front and back internal plates 28*d*₁,*E*₁, respectively. A suitable bolt such as 28*d*₂ is fixedly placed in one such internal plate and extends outward therefrom for threading into a corresponding threaded bore in a front support wall 28*f*. Another bolt such as 28*d*₃ is threadable through a back support wall 28*g* and into a threaded bore in internal plate 28*d*₁. Referring to FIG. 4, it can be seen that the contact between back support wall 28*g* and plate 28*a* provides a connection between securement/release mechanism 30 and the shock absorber structure to promote absorption of shock to system 10** from the bus, thereby substantially reducing the shock being transferred to the protruding structure and mobility aid.

Referring to the left of FIG. 2, opposing bars 28*b* and front support wall 28*f* define an abutment subsection 28*h*, against which engaging expanse (or upright section) 12*a*1 of protruding structure 12 (FIG. 1) abuts when, as will be described, there is engagement between the engaging expanse and the receiving section. Of course such abutment subsection is normally provided in each receiving section 28.

Figure 5:
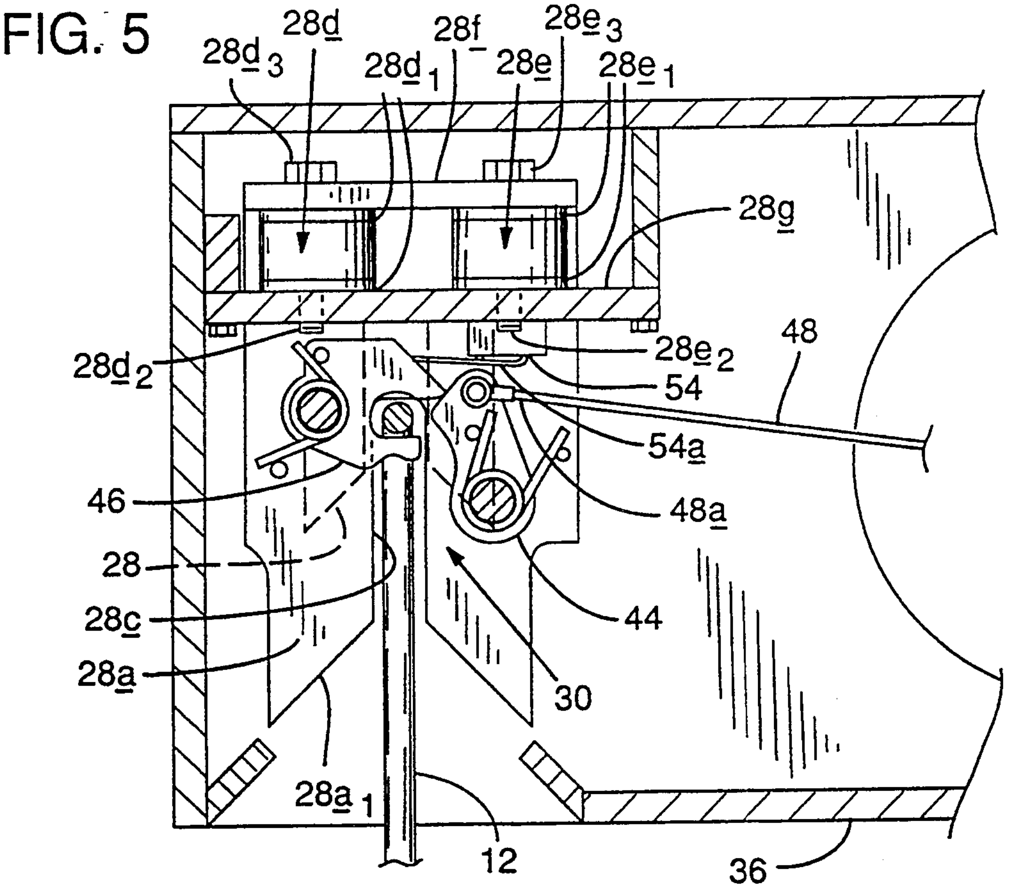
FIGS. 5 and 6 are like FIG. 3 but on even larger scales to show respectively, when a securement condition exists between the protruding structure and the receiver structure, and when such condition does not exist.

Referring to FIGS. 2, 3 and 5–7, securement/release mechanism 30 will now be discussed. First, it should be understood that the preferred embodiment of the invention is designed with a mechanism that automatically secures the protruding structure when it enters space 28*c* of receiving section 28. Thus, the actuators for such mechanism release the securement condition. Essentially, the mechanism includes first and second spring-biased latch members 44, 46 that are biased to an open disposition (FIG. 6) which will receive protruding structure 12 and automatically close around it, causing a securement condition to exist (FIGS. 3 and 5).

Figure 6:
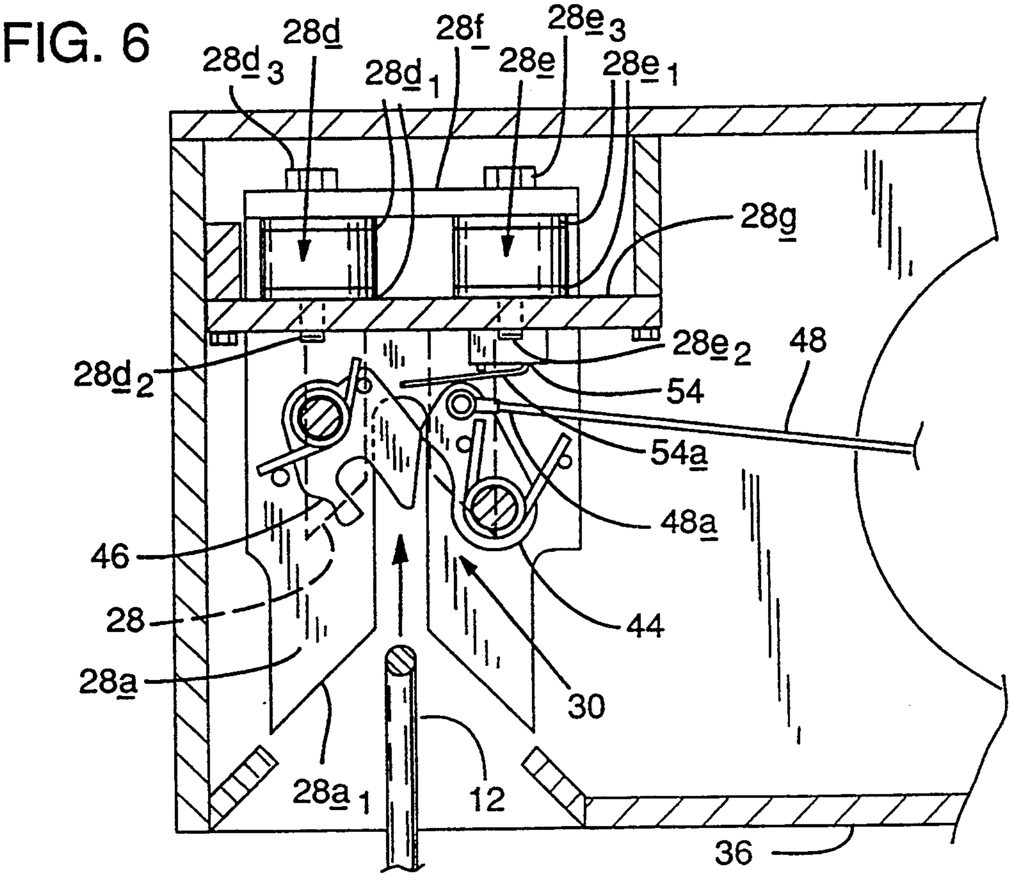

To release the mechanism and allow protruding structure 12 to be removed (i.e., allowing the mobility aid to exit), certain actuators are used to change the relative positions of latch members 44, 46. As best understood by referring to FIGS. 3 and 5, and then FIG. 6, actuation causes a continuous cord 48 to pull toward cylinder 32 which results in latch member 44 rotating clockwise from its securement position, thus allowing latch member 46 to rotate clockwise under its spring bias to its open position (FIG. 6). The other side of receiver structure 14 operates in a mirror image fashion.

Figure 7:
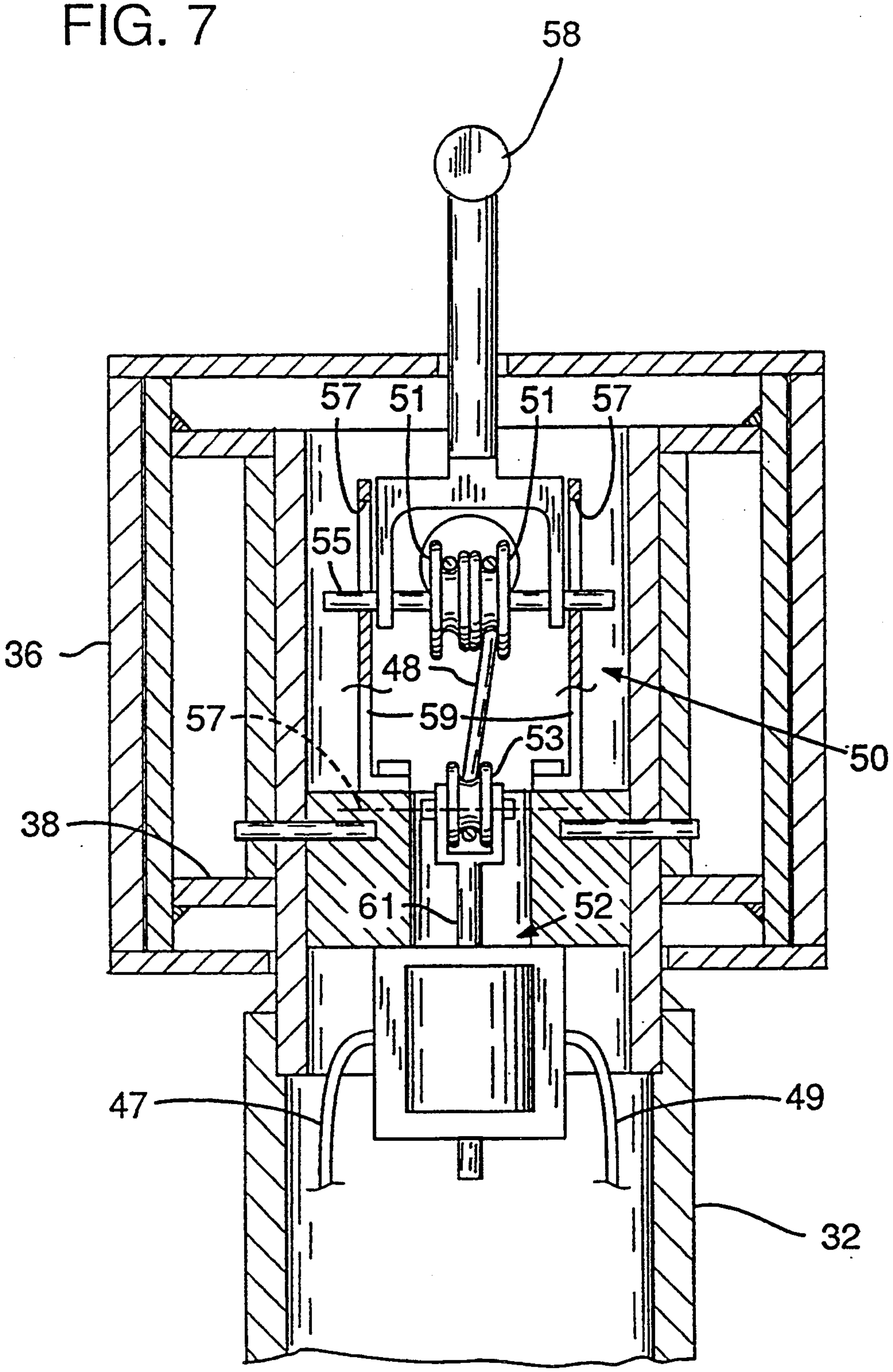
FIG. 7 is a fragmentary, partially sectioned, side elevation view of the receiver structure with portions broken away to show detail.

Referring to FIG. 7, the actuation mechanism is shown in detail with cord 48 being fed through a pulley arrangement generally shown at 50, and including pulleys 51 and 53. The ends 48*a* (one of which is shown in FIGS. 3, 5 and 6) of cord 48 are attached to corresponding dual latch members 44 that form part of mechanism 30 on opposing sides of housing 36 (FIG. 1). The cord passes from latch members 44, over and around coaxial pulleys 51 (FIGS. 3 and 5), and down across pulley 53. Vertical displacement of shaft 55 to which pulleys 51 are rotatably mounted, is permitted because shaft 55 rides in a pair of vertical slots 57 in pulley mounting cage 59. A solenoid 52 is actuable to move rod 61 and pulley 53 bi-directionally by an interconnected, suitable switch (undepicted). The solenoid will move downwardly (FIG. 7) when the switch is thrown to release protruding structure 12 from latch member 46 as discussed above. It should be understood that such switch may be positioned locally for operation by the aid occupant and/or remotely for operation by the bus driver as schematically shown at 47. An interlock is schematically depicted at 49 to show that when the bus is in motion, electrical disengagement normally will not be allowed.

Referring to FIGS. 5 and 6, an indicator structure 54, which may be a suitable microswitch, is operatively connected to securement/release mechanism 30 and structured to provide an indication of whether a securement condition exists. When a securement condition exists (FIG. 5), latch member 46 will push probe 54*a* of switch 54 to activate the switch and turn on light 56 (FIG. 1) which is connected to it via suitable conductors (undepicted). It should be understood that visual and/or audible indicators may be used, and they may be positioned locally or remotely as was discussed in connection with the switches for the securement/release mechanism.

Referring again to FIG. 7 and then FIG. 1, a default actuator is provided whereby if solenoid 52 is not operable, making normal release impossible, the mobility aid occupant or another person could pull up on handle 58, causing shaft 55 and pulleys 51 to move upwardly, thereby increasing the distance between shaft 55 and axis 57, and causing the cord ends 48*a* to be pulled toward the center of the receiver structure 14, thereby releasing the mobility aid as described above.

OPERATION

Referring to FIGS. 1 and 2, the mobility aid occupant can back into receiver structure 14 and protruding structure 12 will be received in receiving section 28. Angled surfaces 28*a*1, 28*b*1 will help to guide the translation or rotation of the receiver structure if the occupant does not back in perfectly with the protruding structure aimed directly at space 28*c*. For example, if the aid occupant backs into position offset from the receiving section 28, the receiver structure 14 will translate and/or rotate to either side or in either direction to accommodate entry. When the protruding structure 12 pushes back on housing 36, the housing can slide relative to bracket 38 along the length of the oblong hole formed in the bottom of the housing. Also, or alternatively, the housing 36 may rotate about cylinder 32 to accommodate entry.

Referring to FIG. 6, upon receiving protruding structure 12 the securement/release mechanism will automatically secure the protruding structure because latch member 44 will rotate clockwise and latch member 46 will rotate counterclockwise under pressure from the protruding structure moving into space 28*c* of receiving section 28. To release the wheelchair, the occupant and/or vehicle driver need only throw the switch actuating securement/release mechanism 30 which pulls latch member 44 clockwise allowing latch member 46 to move clockwise under its spring bias, thereby opening the mechanism and releasing the protruding structure. The mirror motion occurs on the opposite side of the receiver structure 14.

The system also has a backup feature with respect to the release mechanism so that if a preferred release mechanism fails, a default mechanism can be actuated. Referring to FIG. 7, if the solenoid-based switch fails, the aid occupant, the vehicle driver or another person can manually release the mobility aid from receiver structure 14 by pulling up on handle 58 (see also FIG. 1) which causes the ends 48*a* of cord 48 to be pulled toward the center of the unit, pulling on latches 44 and causing the mobility aid to be released.

Referring to FIG. 1, protruding structure 12 also includes an upright section 12*a*1 which allows system 10 to be used with mobility aids having slightly varying heights. Referring to FIG. 1 and then FIG. 2, upright section 12*a*1 is received in abutment subsection 28*h* of receiver structure 14. Due to the height of the abutment subsection, protruding sections that enter space 28*c* from a range of heights may be received and secured. The range of heights may be due to different wheel inflation from one mobility aid to another, or due to different mobility aid construction altogether.

Still referring to FIG. 2, the abutment subsection 28*c* and 28*h* also promotes securement with an anti-tilt feature with either single or multiple protruding structures, and an anti-rotation feature where a single protruding structure is utilized by presenting a relatively broad expanse against which the protruding structure can abut.

Referring to FIGS. 2-4, receiver structure 14 absorbs shock from the transit vehicle via shock absorber structure 28*d,e* which includes flexible, resilient cylinders that are mounted between front and back support walls 28*f,g*. Referring to FIG. 4, contact between back support wall 28*g* and plate 28*a* provide a connection between securement/release mechanism 30 and the shock absorber structure, thereby reducing the shock being transferred to the protruding structure and mobility aid from the bus.

It should also be understood that system 10 holds the aid securely with relatively heavy receiver structure that is also short enough to fit under the front bench seat of a bus similar to conventional bus heaters. There are no extension cords to trip over or encourage tampering. The system has an overall heavy-duty construction with relatively few moving parts. As a consequence, there is little maintenance required and a long working life is achieved.

While the present invention has been shown and described with reference to the foregoing preferred embodiment, it will be apparent to those skilled in the art that other changes in form and detail may be made therein without departing from the spirit and scope of the invention as defined in the appended claims.

What is claimed is:

1. An apparatus having a securement system for a rollable mobility aid with a frame and rollers, which aid is located adjacent surrounding structure, comprising:

a substantially rigid, broad engaging expanse attached to and extending outwardly from such frame, and external of the rollers, with the expanse including an operative region;

upright receiver structure fixedly attached to such surrounding structure in a receiving position, and including a receiving section having a broad vertical region for receiving the operative region, the receiving section further including a selectively actuable engagement/release mechanism for securing the operative region to engage the engaging expanse with the receiving section, with such engagement promoting securement of the aid relative to the surrounding structure to fix the operative region in the receiving section; and wherein the receiver structure includes means to allow the receiver structure to be selectively rotated about its vertical axis and selectively translated with respect to its receiving position, thus to allow for desired adjustment of the receiver structure to accommodate receipt of the operative region by the securement/release mechanism at various positions depending upon the direction from which said aid is rolled toward the system.

2. The apparatus of claim 1 wherein the engaging expanse has an upright section for engaging the receiving section.

3. The apparatus of claim 2 wherein the upright section is vertical and wherein the receiving section further includes an abutment subsection against which the upright section abuts when there is engagement between the engaging expanse and the receiving section.

4. The apparatus of claim 1 wherein the engaging expanse is removably attached to such aid.

5. The apparatus of claim 1 wherein such mobility aid has a perimeter and the engaging expanse extends from such perimeter.

6. The apparatus of claim 1 wherein such mobility aid has a back and the engaging expanse extends from such back.

7. The apparatus of claim 1, 2, 3, 4 or 6, wherein a plurality of broad engaging expanses are arranged in the form of plural spaced members and the receiver structure is constructed with receiving sections to receive said spaced members.

8. The apparatus of claim 7 said plurality of broad engaging expanses are arranged in the form of dual spaced members and the receiver structure is constructed with dual spaced receiving sections to receive said dual spaced members.

9. An apparatus including a securement apparatus for a rollable mobility aid with a frame and rollers, which aid is located within a vehicle, comprising:

a substantially rigid, broad engaging expanse attached to and extending outwardly from such frame, and external of the rollers, with the expanse including an operative region;

upright capture structure fixedly attached to the interior of such vehicle in a receiving position, and including a receiving section having a broad vertical region for receiving the operative region, the receiving section further including a selectively actuable securement/release mechanism for securing the operative section when there is engagement between the engaging expanse and the receiving section, with such engagement promotion securement of the aid relative in the vehicle; and wherein the capture structure includes a substructure that provides selective rotational movement of the capture structure about its vertical axis, and a substructure that provides selective translational movement of the capture structure with respect to its receiving position, thus to allow for desired adjustment of the capture structure to accommodate receipt of the operative region by the securement/release mechanism at various positions and angles depending upon the direction from which such aid is rolled toward the system.

10. The apparatus of claim 9 further including indicator structure operatively connected to the securement/release mechanism and structured to provide an indication of whether a securement condition exists.

11. The apparatus of claim 10 wherein the indicator structure is constructed with a local indicator viewable by an aid occupant when seated in the aid.

12. The apparatus of claim 9 wherein the engaging expanse has an upright section for engaging the receiving section.

13. The apparatus of claim 12 wherein the upright section is vertical and wherein the receiving section further includes an abutment subsection against which the upright section abuts when there is engagement between the engaging expanse and the receiving section.

14. The apparatus of claim 9 wherein the engaging expanse is removably attached to such aid.

15. The apparatus of claim 9 wherein such aid has a back and the engaging expanse extends from such back.

16. The apparatus of claim 9, 12, 13 or 14 wherein the a plurality of broad engaging expanses are arranged in the form of plural spaced members and the capture structure is constructed with receiving sections to receive said spaced members.

17. The apparatus of claim 16 wherein said plurality of broad engaging expanses are arranged in the form of dual spaced members and the capture structure is constructed with dual receiving sections to receive said dual spaced members.

18. The apparatus of claim 16, wherein the receiving section further includes shock absorber structure attached to the securement mechanism and operable to promote absorption of shock to the apparatus to reduce the shock being transferred to the protruding structure and mobility aid.

19. The apparatus of claim 16, wherein the securement/release mechanism includes plural types of actuators, one type being a preferred actuator and another type being a default actuator for use if the preferred type malfunctions, thus to ensure that the mobility aid maybe released from the system.

20. The apparatus of claim 9 wherein the receiving section further includes shock absorber structure attached to the securement/release mechanism and operable to promote absorption of shock to the apparatus to reduce the shock being transferred to the engaging expanse and mobility aid.

21. The apparatus of claim 9 wherein the securement/release mechanism includes plural types of actuators, one type being a preferred actuator and another type being a default actuator for use if the preferred type malfunctions, thus to ensure that the mobility aid may be released from the system.

22. An apparatus including a securement apparatus for a rollable mobility aid with a frame that includes a broad engaging expanse and rollers, which aid is located within a vehicle, comprising:

upright capture structure fixedly attached to the interior of such vehicle in a receiving position, and including a receiving section having a broad vertical region for receiving the engaging expanse, the receiving section further including a selectively actuable securement/release mechanism for securing the engaging expanse when there is engagement between the engaging expanse and the receiving section, with such engagement promoting securement of the aid in the vehicle; and wherein the capture structure includes a substructure that provides selective rotational movement of the capture structure about its vertical axis, and a substructure that provides selective translational movement of the capture structure with respect to its receiving position, thus to allow for desired adjustment of the capture structure to accommodate receipt of the engaging expanse by the securement/release mechanism at various positions and angles depending upon the direction from which such aid is rolled toward the system.

23. The apparatus of claim 22 further including indicator structure operatively connected to the securement/release mechanism and structured to provide an indication of whether a securement condition exists.

24. The apparatus of claim 23 wherein the indicator structure is constructed with a local indicator viewable by the aid occupant when seated in the aid.

25. The apparatus of claim 22 or 23 wherein the receiving section further includes shock absorber structure attached to the securement/release mechanism and operable to promote absorption of shock to the apparatus to reduce the shock being transferred to the mobility aid.

26. The apparatus of claim 22 or 23 wherein the securement/release mechanism includes plural types of actuators, one type being a preferred actuator and another type being a default actuator for use if the preferred type malfunctions, thus to ensure that the mobility aid may be released from the system.

27. An apparatus including securement apparatus for a rollable mobility aid with a frame and rollers, which aid is located adjacent surrounding structure, comprising:

plural arm members, each with first and second ends, and with each said first end being rigidly attached to the frame, and each said second end formed with an aperture; and upright receiver structure fixedly attached to such surrounding structure in a receiving position, and including a receiving section constructed to receive the second ends of said arm members, and the receiving section further including a selectively actuable engagement/release mechanism for securing the second ends of said arm members to engage the arm members with the receiving section, with such engagement promoting securement of the aid relative to the surrounding structure to fix the second ends of said arm members in the receiving section.

* * * * *